Sept. 17, 1940.   L. G. BOWEN   2,214,828
TWO-SPEED SPROCKET
Filed April 8, 1938   3 Sheets-Sheet 1

INVENTOR
LESLIE G. BOWEN
BY Alfred R. Fuchs
ATTORNEY

Sept. 17, 1940.    L. G. BOWEN    2,214,828
TWO-SPEED SPROCKET
Filed April 8, 1938    3 Sheets-Sheet 2

INVENTOR
LESLIE G. BOWEN
BY Alfred R. Fuchs
ATTORNEY

Sept. 17, 1940.  L. G. BOWEN  2,214,828
TWO-SPEED SPROCKET
Filed April 8, 1938  3 Sheets-Sheet 3

INVENTOR
LESLIE G. BOWEN
BY Alfred R. Fuchs
ATTORNEY

Patented Sept. 17, 1940

2,214,828

UNITED STATES PATENT OFFICE 2,214,828

TWO-SPEED SPROCKET

Leslie G. Bowen, Kansas City, Mo.

Application April 8, 1938, Serial No. 200,898

18 Claims. (Cl. 74—290)

My invention relates to sprocket wheels, and more particularly to a two-speed sprocket wheel.

It is a purpose of my invention to provide a two-speed drive for bicycles and other apparatus, and particularly to provide a two-speed sprocket wheel for bicycles, which, when operating in high gear, operates substantially in the same manner as any ordinary sprocket wheel, and when operating in low gear, drives the chain receiving sprocket portion of the wheel at a slower speed than the pedals attached to the sprocket wheel or crank shaft, so as to form a speed reduction device.

It is a further purpose of my invention to provide a speed reduction device, such as a sprocket wheel of the above mentioned character, which is simple in construction and extremely compact in arrangement, so that the sprocket wheel will not take up any more room than the ordinary sprocket, usually provided on the crank shaft of a bicycle. Also it is a purpose of my invention to provide a sprocket wheel that is light in weight, so that the weight of the bicycle will not be unnecessarily increased by the use of the two-speed mechanism comprising my invention.

It is another purpose of my invention to provide a two-speed sprocket, or other two-speed driving device, of the above mentioned character, which has the rotating parts constituting the speed reduction mechanism, entirely enclosed, so as to prevent the entrance of dirt into the same, and to permit said rotating parts constituting the speed reduction mechanism, to be packed in grease. Furthermore it is a purpose of my invention to so construct the two-speed sprocket and operating means therefor, that none of the parts are exposed in a manner such that the same can come in contact with the body or the clothing of the operator thereof.

It is still another purpose of my invention to provide a two-speed sprocket that has no projecting parts thereon extending beyond the side face thereof that is outermost when the sprocket wheel is in position on the bicycle, so that there will be no projecting parts on the rotatable sprocket that could injure the operator of the bicycle or damage the clothing of such operator.

It is a specific purpose of my invention to provide a two-speed sprocket, in which the normal, or high, speed is obtained by a direct drive of the sprocket toothed portion from the crank shaft, and whereby the slower speed is obtained by mechanism within the sprocket, comprising a central ring-like member and a driving member spaced from the ring-like member to provide an annular way between the same, said driving member being fixed to rotate with the crank axle, and rotatable members mounted between the central ring-like member and the driving member and engaging both thereof, said rotatable members being mounted on the member having the sprocket teeth thereon, and said mechanism further comprising means for either rotating the ring-like member and the driving member as a unit, or rotating the driving member relative to the ring-like member, said ring-like member being held stationary. The rotatable members roll about on the ring-like member when the same is so held stationary to cause the sprocket member to rotate in the same direction as the driving member, but at a slower speed.

It is still a further specific purpose of my invention to provide means for locking said ring-like member to the driving member, so as to rotate therewith, and to unlock said driving member and ring-like member from each other so that relative rotation of the same can take place while holding said ring-like member stationary, said means for holding the ring-like member stationary being all carried by the two-speed sprocket itself, except for a single bracket member secured to the bicycle frame and a flexible operating member and actuating means therefor, also carried by the bicycle frame, said mechanism for adjusting the device to either operate in high or low gear being thereby so constructed that the same can be readily mounted on any bicycle, no matter what type of frame or construction of frame may be used thereon.

It is still another purpose of my invention to provide the means for controlling said two-speed sprocket to either drive the sprocket toothed portion at the same speed or at a lower speed than the driving member, in which all of the mechanism outside the sprocket wheel for accomplishing the adjustment thereof is located on the side of the sprocket toward the bicycle frame, and in which the apparatus carried by the sprocket wheel for adjusting the sprocket to operate in either high or low speed adjustment is substantially entirely confined within the sprocket wheel.

It is a further purpose of my invention to provide means for preventing rearward rotation of said ring-like member when it is desired to apply the brake to the bicycle through the usual coaster brake mechanism, and while the mechanism is being actuated to shift the drive from high to low speed, so that said means for providing the two-speed drive for the sprocket will not prevent reverse rotation of the sprocket portion when a rearward push is given to the pedals, while the driving mechanism is being shifted into slow speed, or is operating in slow speed.

It is a further purpose of my invention to provide means for preventing the actuation of the means for fixing said ring-like member in a stationary position when the pedals are being given a rearward rotation to apply the coaster brake while the apparatus is in direct drive.

Other objects and advantages of my invention will appear as the description of the drawings proceeds. I desire to have it understood, however, that I do not intend to limit myself to the particular details shown or described, except as defined in the claims.

Referring in detail to the drawings, my improved two-speed drive mechanism is shown as being applied to a bicycle having a frame 22 made up of tubular members, and which comprises a horizontally extending frame portion 23, to which the clamp 24 of the bracket member 25 is secured. Incorporated in said frame is also a bearing 26 for a crank shaft 27, from which the crank members 28 extend, said crank members being operated in any suitable manner, as by pedals, as in the ordinary bicycle.

Mounted on the crank shaft 27 is the sprocket wheel comprising the disk-like member 29, which is provided with a thickened portion adjacent the central opening therein, which is shown as being formed of a ring-like member 30, that is integrally united with the member 29, by welding or in any other suitable manner. The ring-like member 30 is shown more in detail in Fig. 10, said member having a plurality of alternating projections 31 and recesses 32 on the periphery thereof, the one wall 33 of each recess being undercut, and the other wall 34 thereof being substantially radial, the slope of the wall 33 being substantially on an arc having a radius that is substantially the length of a locking dog, to be described below, cooperating with said projections and recesses, and about a center that lies on the same circle as the pivotal axis of said pivoted locking dog, above referred to.

Said disk-like member 29 is also provided with a thickened annular portion 35 spaced inwardly from the periphery thereof to provide an annular ledge or shoulder 36, said annular thickened portion being formed by a ring-like member, which is integrally united with the disk member 29, as by means of welding. Said annular member 35 further has a lateral annular enlargement 37, in which a ball race 38 is formed. Inwardly from the ball race, and adjacent the same on the enlargement 35, is an annular series of internal gear teeth 39 extending around the entire inner periphery of said thickened portion 35, thus forming an internal ring gear on the disk-like member 29 substantially in alignment with the alternating recesses and projections 32 and 31, but spaced therefrom a substantial distance.

Encircling the thickened portion 30 of the disk-like member 29 is a ring-like member 40. Said member 40 has an annular series of gear teeth 41 on the outer surface thereof, which align with the teeth 39 on the ring-like member 29 and are spaced therefrom so as to provide an annular way between said teeth 39 and 41. Said ring-like member 40 has an inwardly directed flange 42, extending inwardly from the toothed portion thereof and out of alignment with said toothed portion, said flange being interrupted at 43, as will be evident from Fig. 10, the interruption in said flange comprising a radially extending shoulder 44, connected with an inclined edge portion 45, by means of a substantially straight edge portion 46, said flange portion 42 having a reduced portion 47 thereon, which terminates in a substantially radial end wall 48 spaced from the shoulder 44 a predetermined distance, said reduced portion 47 having a convex edge portion 49 terminating in a partly circular recess 50, said convexly curved portion 49 being curved about a center that is eccentric to the axis of the ring-like member 40. The purpose of said interruption in the flange will be explained below.

Said ring-like member 40 also has a laterally projecting annular thickened portion 51, which is provided with a ball race 52 therein, said thickened portion 51 projecting so as to provide an annular ledge or shoulder 53, said ring-like member 40 further being provided with an external ball race 54 adjacent the toothed portion 41 thereof. The disk-like member 29 is provided with an opening 55, which extends into the thickened portion 30 thereof, and which receives a drive pin 20 extending through the same and the crank 28 adjacent thereto, to drive the sprocket wheel from the crank in the usual well known manner.

An annular side plate 56, which is dished at 57 and which has the thickened rim portion 58, on which the sprocket teeth 59 are provided, cooperates with the disk-like member 29 to form a housing, said side plate having a laterally projecting annular flange 60, which embraces the shoulder 53 on the ring-like member 40. The annular side plate 56 is provided with a plurality of equally spaced openings 61 therein, through which headed screw-like members 62 extend, having the threaded portions 63 that are received in threaded openings 64 in a ring 65 to fix said ring to said side plate 56. Projecting from said ring are fixed stub shafts 66, which alternate with the screw-threaded openings 64. Mounted on said stub shafts 66 are the pinions 67 for free rotation thereon, said pinions 67 having teeth 68 that mesh with the teeth 39 and 41, as will be evident from Fig. 2. The particular number of pinions 67 provided is immaterial, as is also the particular number of fastening elements 62, any convenient or desirable number to obtain the desired strength being utilized.

Mounted within the member 40, within the lateral projection 51 thereon, is a locking ring 69, said locking ring having a ball race 70 on the outer surface thereof and receiving the bearing balls 71 that space said ring 69 from the ring-like member 40, and provide for relative rotation between said ring 40 and said ring-like member 69 when this is desired. Said locking ring has an inwardly directed flange 72 thereon, which is interrupted to provide a gap therein substantially equal to the distance between the shoulder 44 and the end wall 48 on the flange 42 on the member 40, providing shoulders or abutments 73 and 74 thereon. The body portion of said ring-like member 69 is recessed to provide shoulders 73' and 74', which align with the shoulders 73 and 74, and to provide a pair of concave recesses 75 and 76 spaced from the shoulders 73' and 74', and to provide the annular wall portions 77 lying between the shoulders 74' and 73' and the recesses 75 and 76, and between the two recesses 75 and 76 so as to provide an edge that is projected radially outwardly beyond the inner edge of the main body portion of the member 69, the recess thus formed being shaped so that the recesses 75 and 76 loosely receive the convex projections 78 and 79 on the rockable annular locking member 80, which has an enlargement thereon at 81 that is received in said recess, so as to loosely fit between the shoulders 73' and 74' and within the annular wall 77.

Said rockable locking member 80 is provided with a pair of sockets 82 therein, and with a pin 83, projecting radially inwardly therefrom midway between the sockets 82. The enlargement 81 also projects laterally from the face of the ring-like member 80 on the opposite side thereof from that on which the sockets 82 open, so as to provide the abutments 84 and 85, which align with the shoulders 73 and 74, so that the ring-like member 80 is laterally movable relative to the locking ring 69 to project the enlargement 81 through the space between the two abutments 73 and 74 at the interruption in the flange 72 of said locking ring 69. The rockable laterally movable annular locking member 80 is provided with a convexly rounded projection 86 thereon at a point diametrically opposite the pin 83, which seats loosely in a small shallow concave recess 87 in the member 69, so that said member 80 is rockable about the pivot thus formed by means of the projection 86 and the recess 87. Said ring 80 is confined between the flange 72 on the member 69 and a fixed ring 88, which is provided with a pair of openings 89 that receive the hardened pins 90 that project laterally from the member 69 to thus hold said members 69 and 88 in fixed position relative to each other.

The ring-like member 88 is further secured to the member 69 by means of screw-threaded headed fastening elements 91, which, however, merely secure the parts together and are not subjected to any shearing stresses. The ring-like member 88 is held in fixed position by means of the bracket 25, said ring-like member having an ear 92 projecting laterally therefrom, which is received within the bracket 25 and is secured thereto by any suitable fastening element, such as the bolt 93, extending through the opening 94 in said ear 92, and through aligning openings in the bracket 25. It will thus be seen that the ring-like member 88 is stationary. Said ring-like member 88 fits within the annular flange 60 on the side plate 56 to thus complete the housing formed by the disk-like member 29 and the side plate 56. The member 69 is also held against rotation, as is also the annular rockable locking member 80, due to the fact that the member 88 is held stationary. However, the member 40 is freely rotatable about the member 69 whenever this is desired, due to the provision of the ball bearings 71, it being desired at certain times to hold the member 40 stationary with the ring 88 and the member 69, and at other times to permit rotation thereof about the ring 69 and relative to the ring 88.

Mounted within the ring-like member 88 is a ring-like gear shift actuating member 95, which is rotatable relative to the ring 88 to a limited extent, and which has a shoulder 96 provided thereon, against which the inner edge portion of the ring-like member 88 fits to hold the actuating ring 95 in place. Said actuating ring is provided with a reinforcement 97 and an ear 98, which has an opening 99 therein for receiving a flexible actuating member 100, which is mounted on the frame and is provided with any suitable member for shifting the same lengthwise of itself, either in a backward or forward direction, as may be the choice of the operator. The ring 95 is shown more in detail in Figs. 5 and 6. Said ring also has a laterally projecting flange 101, providing an annular shoulder 102, said flange 101 seating within the opening in the flange 42 on the member 40, and the shoulder 102 engaging the side of said flange 42, to thus confine the ring-like member 95 between the flange 42 and the ring 88, preventing any axial shifting thereof. Said ring 95, as will be evident from Fig. 6, has a cam slot 103 therein, which has end walls 104 and 105, and a straight wall 106, which extends parallel to the side face of the ring 95, and a curved wall 107 opposite the wall 106 gradually diverging therefrom, from the end wall 105 to the end wall 104. The pin 83 is mounted in the slot 103 when the parts are in assembled relation, and due to the fact that the ring 80 can move laterally of itself relative to the member 40, it is urged in a direction, such that the pin 83 tends to move toward the side wall 107 of the slot 103, by means of the compression coil springs 108 and 109 seated in the two sockets 82 in the enlargement 81.

The position of the ring 95 will determine the amount of lateral movement that is possible for the enlargement 81 on the ring 80. That is, when the pin 83 is in the end of the slot that is shown at the right in Fig. 6, the enlargement 81 on the ring 80 cannot move laterally relative to the member 40, because the wall 107 of the slot will prevent this. However, when the pin 83 is in the opposite end of the slot, or that adjacent the end wall 104, such lateral movement of the enlarged portion 81 of the ring-like member 80 can take place under the urging of the springs 108 and 109. Due to the pivotal mounting of the ring 80 diametrically opposite to the pin 83, a rocking movement about the pin 83, and the pivot member made up of the projection 86 and recess 87 of the ring 80, can also take place.

Figure 2:
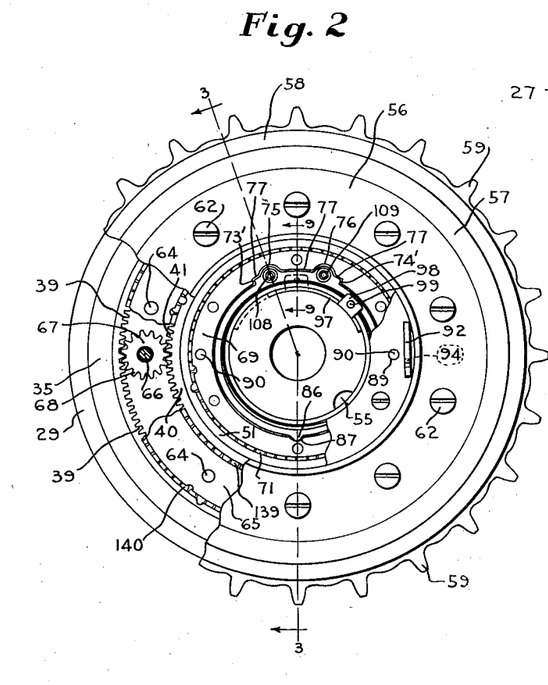
Fig. 2 is a view in side elevation, partly broken away, of my improved two-speed sprocket.
Figure 3:
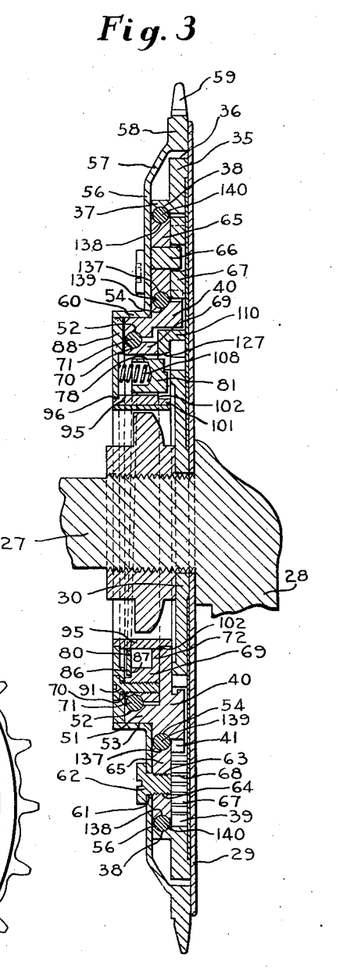
Fig. 3 is a section thereof taken substantially on the line 3—3 of Fig. 2, showing a fragment of the crank on which the sprocket is mounted.

When the wire or flexible member 100 is pulled forward the ear 98 on the ring 95 will be pulled to the left in Fig. 2, and the pin 83 will be in the narrow portion of the slot adjacent the end wall 105, while, if the flexible member or wire 100 is actuated so that a push is exerted thereon, the ear 98 will be moved backwardly, or toward the right in Fig. 2, thus moving the ring 95 in a clockwise direction relative to the ring 80 and causing the pin 83 to be located in the wide portion of the slot 103 adjacent the end wall 104 thereof. When the pin is in the end of the slot adjacent the end wall 105, the sprocket wheel is in high gear, or in other words, all the parts thereof are rotating in unison at the same speed, as will be explained below, and thus when a pull is exerted on the wire or flexible member 100, the sprocket will be in such high gear or high speed adjustment. When the opposite movement of the flexible member or wire 100 takes place, the shift to low gear or slow speed, is obtained.

Figures 9, 10, 11, 12, 13:
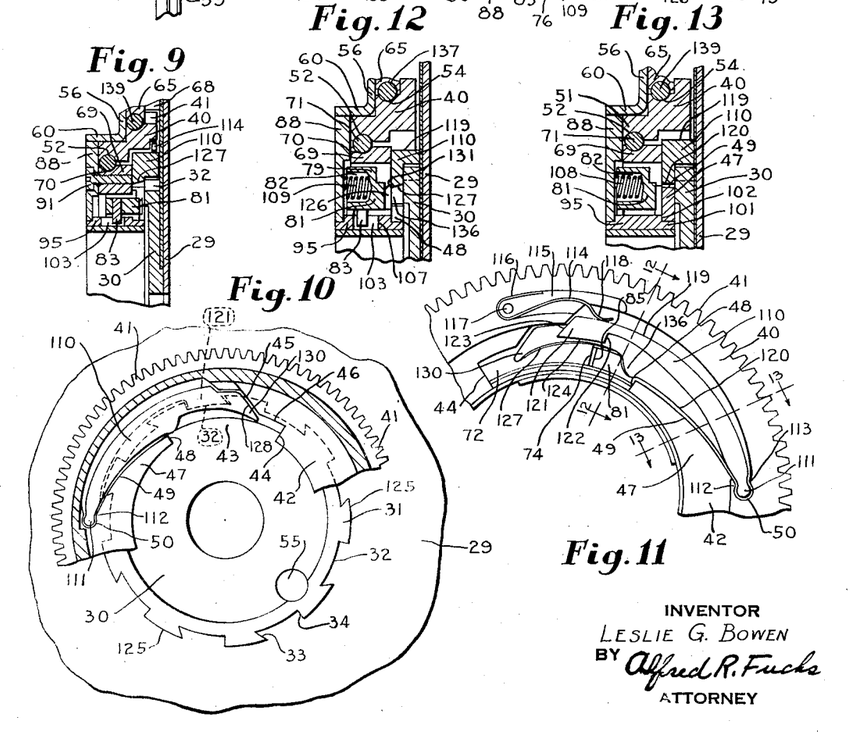
Fig. 9 is a fragmentary sectional view, taken on a line corresponding substantially to the line 9—9 of Fig. 2.
Fig. 10 is a fragmentary side view partly in elevation and partly in section, of the locking mechanism in one position thereof, the position of the parts being those which these assume when the locking dog is in position to lock the parts in high gear.
Fig. 11 is a fragmentary view in side elevation of the locking mechanism, showing the locking dog and the unlocking means therefor at the beginning of the unlocking action thereof, the parts being shown from the opposite side of the sprocket from that shown in Fig. 10.
Fig. 12 is a fragmentary sectional view, taken on a line substantially corresponding to the line 12—12 of Fig. 11.
Fig. 13 is a fragmentary sectional view taken on a line corresponding substantially to the line 13—13 of Fig. 11.

The locking of the parts in such position, that the driving member, constituting the disk-like member 29, and the member 56, having the sprocket teeth 59, rotate at the same speed, is accomplished by means of a pivoted locking dog, or locking lever, 110. One side of said locking lever 110 is shown in Fig. 10 and the opposite side thereof is shown in Fig. 11. At one end said locking lever has a substantially cylindrical convexly curved pivot formation 111 thereon, which is, in effect, a head that constitutes an integral pivot pin for the member 110, which is mounted in the concave recess 50 in the member 40, there being projections 112 and 113 on the member 40 adjacent the socket 50 formed therein, so as to prevent any endwise movement of the lever-like locking dog 110 relative to the member 40. Said locking dog is thus pivotally mounted for limited movement about a pivotal axis, located at the center of the socket 50, on the central ring-like member 40. A spring 114 is mounted in a recess 115 in the member 40 and has an end portion 116 extending around a pin 117, provided in said recess 115. Said spring 114 engages slidably, by means of the curved end 118 thereof, with the radially outer, curved edge 119 of the locking dog 110. The locking dog 110 is limited in its inward movement toward the axial center of the member 40, by means of the radially inward concavely curved face 120 thereof engaging the curved edge 49 on the flange 42 on said member 40.

When the locking dog 110 is in its innermost position, that is, with the end thereof opposite the pivot 111 nearest the axial center of the sprocket, the laterally projecting locking lug 121 thereon is seated in one of the recesses 32, as shown in dotted lines in Fig. 10. Said locking lug has a substantially radially extending rear wall 122 and an inclined or beveled forward wall 123. The inclined forward wall 123 lies substantially on the arc of a circle that would have its center at the axial center of the pivot 111, and the walls 33 of the alternating projections and recesses 31 and 32 are inclined on the same radius of curvature, so that said locking formation or lug 121 will readily swing into a recess 32 upon alignment therewith under the urgings of the spring 114, unless held from such movement by means provided for the purpose of unlocking the parts and holding the same unlocked. When the projection 121 is in one of the recesses 32 the parts are locked together, so that the central ring-like member 40 and the disk-like driving member 29 will rotate as a unit, thus holding the pinions 67 stationary and rotating the sprocket toothed member 56 in unison with the crank shaft and the driving member 29. Any tendency of the member 40 to rotate in a forward or clockwise direction, as viewed in Fig. 10, relative to the disk-like member 29, will cause the pointed end of the forward inclined face of the projection or lug 121 to crowd downwardly into the undercut corner provided in the recess 32 due to the inclined wall 33 at one end thereof, while any tendency toward relative movement in the opposite direction will be prevented by the engagement of the radial wall or shoulder 122 on the projection 121 with the radial wall 34 of said recess 32.

Figure 1:
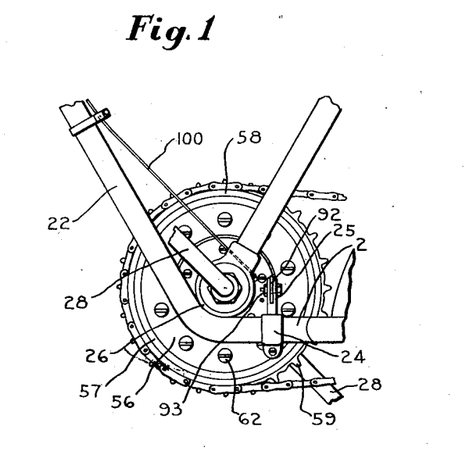
Fig. 1 is a fragmentary side elevational view of the portion of a bicycle frame at and adjacent the sprocket wheel, showing my improved two-speed sprocket mechanism applied thereto.

The sprocket wheel as a whole rotates in a forward direction when rotating in a counter-clockwise direction, as viewed in Fig. 1 and Fig. 2. Accordingly, inasmuch as the central ring-like member 40 is held stationary, in a manner to be described below, before the parts are moved into the position shown in Fig. 10, to lock the sprocket wheel in high speed driving condition, the movement of the member 29, having the projections 31 and recesses 32 thereon, prior to such locking in high speed, would be in a counter-clockwise direction relative to the member 40 carrying the locking dog 110, as viewed in Fig. 10. Accordingly, as soon as said locking dog is released so as to be free to move inwardly under the pressure of the spring 114, the bottom surface 124 of the lug 121 will ride along on the top surface 125 of a projection 31 until it reaches a position such that the wall 34 of a recess 32 will pass the end wall 122, whereupon it will immediately drop into interlocking relationship with the recess 32 in the member 40 to cause said member 40 to rotate in unison with the disk-like member 29.

Assuming that the parts are in the position shown in Fig. 10, that is, so that the sprocket toothed member 56 and the driving member 29 are rotating in unison, and it is desired to shift into low gear, or so that the sprocket toothed member rotates at a slower speed than the driving member 29, it is necessary to release the locking projection on the locking dog 110 from the recess 32, in which the same is located, and immediately thereafter lock the member 40 in a stationary position. In order to accomplish this, the actuating member 95 is shifted to the position in which the lug 83 is in the wide part of the slot 103, or adjacent the end wall 104. The parts being viewed from the opposite side of the sprocket wheel in Fig. 11 from that in Fig. 10, it will be obvious that, if the member 40 rotates in a counter-clockwise direction in Fig. 10 as it is being carried along with the driving member, it will rotate in a clockwise direction as viewed in Fig. 11. Accordingly, when the gap 43 in the member 40 begins to align with the gap between the abutments 73 and 74 in the flange 72 on the member 69 during such rotation, the abutment 74 will first be passed by the end wall 48 on the reduced portion 47. As this occurs, a cam-like projection 126 on the enlargement 81, which is projected through the gap between the end faces 73 and 74 on the flange 72, due to the pressure of the springs 108 and 109, will ride along on the rear face of the portion 47, that is, that opposite to that which is seen in Fig. 11, and will prevent further projection of the enlargement 81 on the member 80 beyond the surface of the flange 72 facing the flange 42 on the member 40. This condition is existing in Fig. 11. Figs. 12 and 13 show the relative position of certain of the parts of the locking mechanism, as viewed on the section lines 12—12 and 13—13 of Fig. 11.

Figures 14, 18:
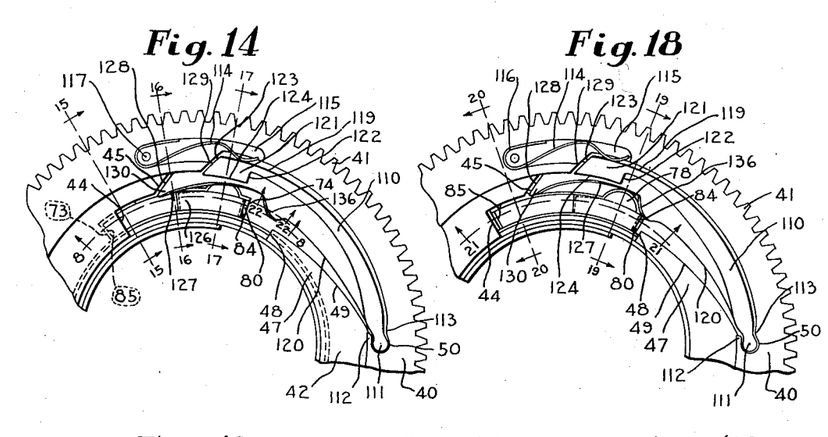
Fig. 14 is a view similar to Fig. 11, showing the position of the parts when the locking dog has been moved to a position to release the parts from their high gear position.
Fig. 18 is a view similar to Fig. 14, with the locking dog and associated parts in the position that the same assume when the release of the central ring-like member from the sprocket toothed member and locking of the same in a stationary position is completed.
Figure 15:
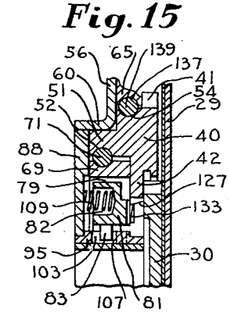
Fig. 15 is a fragmentary sectional view taken on a line corresponding substantially to the line 15—15 of Fig. 14.
Figure 16:
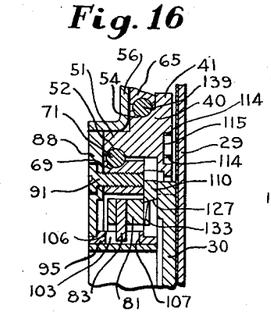
Fig. 16 is a similar view taken on a line corresponding substantially to the line 16—16 of Fig. 14.
Figure 17:
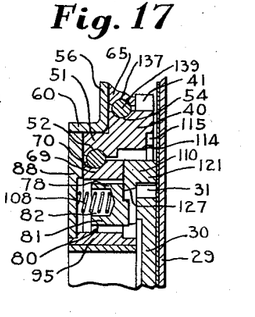
Fig. 17 is a similar view taken on a line corresponding substantially to the line 17—17 of Fig. 14.

In Fig. 11 the position of the parts shown is that before any lifting of the projection 121 out of the recess 32, in which it is located, takes place. As the member 40 continues rotation in a clockwise direction, the dog 110 passes in front of the projection 81, the projection 81 being held back so that the springs 108 and 109 do not project the same forwardly beyond the face of the member 69 until after the end wall 85 of the projection 81 is back of the reduced forward end of the dog 110, just back of the nose or point 130 thereon, the member 110 then holding the member 81 from projection beyond the surface of the member 69 until after the edge 44 of the flange 42 has passed in front of the member 81, as shown in Fig. 14. After the reduced end of the dog 110 has passed in front of the projection 81, and before the edge 44 has passed in front of said projection, the projection 126 engages the lower curved surface 127 of the dog 110. The curved bottom edge 127 is transversely beveled to provide a thread thereon, and, after the projection 126 is disengaged by the reduced portion 47, and the projection 136 on the dog 110 has passed the projection 126, the ring 80 rocks on its pivotal mounting so as to throw the end 84 thereof slightly outwardly, the thread 131 on the projection 126 being then in position to engage the thread on the lower curved surface 127, said threads being guided into engaging position by means of the thread 133 on the front of the projection 126, which first engages the thread on the under side 127 of the member 110 near the corner of the said projection. The engagement of the forward corner and upper edge of the projection 126 with the curved under face 127 of the member 110 raises the locking dog 110 from the position shown in Fig. 11 to that shown in Fig. 14, and when the position of the parts shown in Fig. 14 is reached the projection 121 is unlocked from the recess 32. As soon as such unlocking takes place the ring-like member 40 is free to rotate in either direction relative to the other parts of the sprocket wheel.

Figures 4, 5, 6, 7, 8:
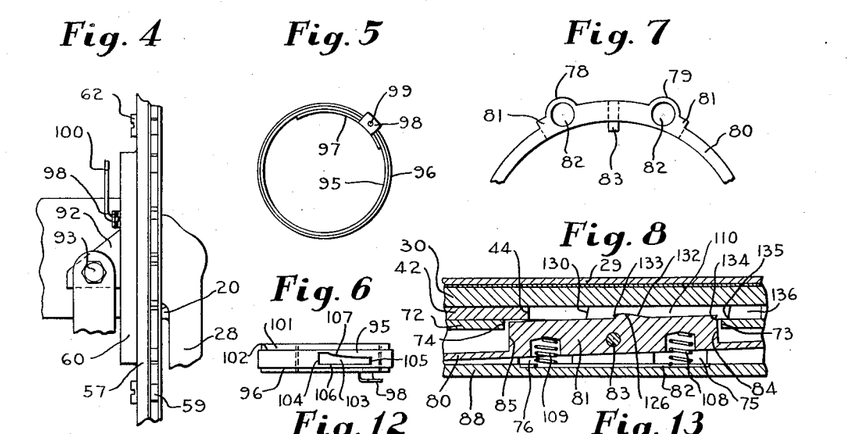
Fig. 4 is a fragmentary elevational view taken substantially at right angles to Fig. 1 on an enlarged scale.
Fig. 5 is a side elevational view of the stop mechanism actuating ring detached.
Fig. 6 is an elevational view thereof, as viewed from the top of Fig. 5.
Fig. 7 is a fragmentary side elevational view of the rockable locking dog actuating and locking ring.
Fig. 8 is a fragmentary circumferential sectional view of the locking dog actuating mechanism in one position thereof, said view being taken on a line corresponding substantially to the line 8—8 of Fig. 14.
Figures 19, 20, 21, 22:
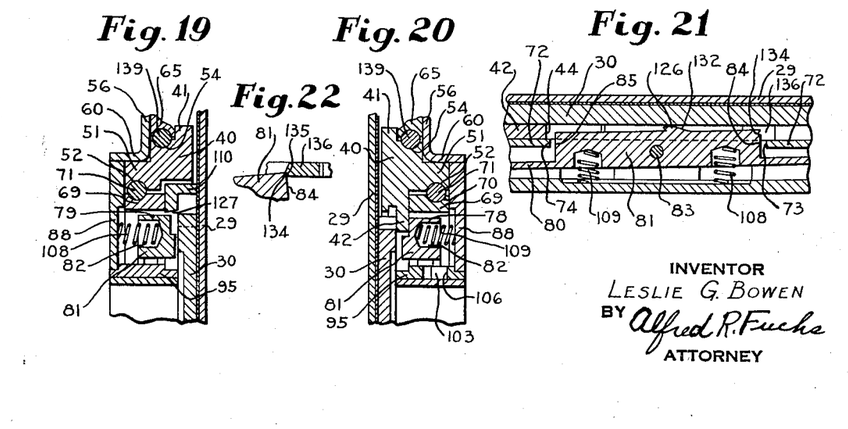
Fig. 19 is a view taken substantially on a line corresponding to the line 19—19 of Fig. 18.
Fig. 20 is a view similar to Fig. 19, taken on a line corresponding to the line 20—20 of Fig. 18.
Fig. 21 is a circumferential sectional view taken substantially on a line corresponding to the line 21—21 of Fig. 18.
Fig. 22 is a fragmentary section taken substantially on the line 22—22 of Fig. 14, but with the parts in a different position than in Fig. 14.

The force applied to the crank by means of the pedals of the bicycle would cause a rotation of the ring-like member 40 backwards when so released, due to the provision of the pinions 67. However, this backward movement is only momentary, as will be explained below. Said backward movement causes the projection 121 to ride on top of a projection 81 keeping the member 110 raised and allowing the thread 134 on the face 84 of the projection 81 to be engaged by the thread 135 on the cam projection 136 on the locking dog 110, as shown in Figs. 8 and 22, causing the corner of said member 81 at the face 84 to lift the lever 110 completely out of way to the position shown in Fig. 18, due to the engagement of the cam surface on the projection 136 with said corner of the projection 81. Before this backward movement takes place, the ring 80 is in the position shown in Fig. 8 with the end of the projection 81 adjacent the end wall 84 projected outwardly further than the end thereof adjacent the end wall 85, as the end 84 thereof is free of the flange on the ring 40, while the end 85 thereof is back of said flange, and the only thing that limits the rocking movement of the ring 80 is the engagement thereof with the member 88 at a point substantially ninety degrees from the pivots of the member 81. It will thus be seen that the thread 134 will be in proper position for engagement with the thread 135 and no change in the annular position of the member 81 will take place until after the reverse movement of the member 40 has been sufficient that the end wall 85 passes the edge 44 of the flange 42, whereupon the ring 80 will swing to the position shown in Fig. 21.

When the projection 81 passes into position between the end wall 48 and the edge 44 of the gap 43 in the flange 42, the rounded projection 78 on the enlargement 81 on the ring-like member 80 engages under the projection 136 and under the curved surface 127 of the locking dog 110 in the manner shown in Fig. 18 to lock said locking dog 110 in its retracted position. The end wall 85 will then be adjacent the edge 44 and the end wall 84 will be adjacent the end wall 48, interlocking the members 69 and 40 and holding the ring-like member 40 stationary. Such interlocked condition will continue until the ring 95 having the cam slot 103 is shifted by actuation of the flexible member 100. When such interlocking occurs, and the ring-like member 40 is held stationary, the locking dog 110 is in the position shown in Fig. 18, with the forward inclined wall 123 of the lug or projection 121 lying adjacent the inclined edge 129 of the recess provided for receiving said locking dog in the member 40, and with the inclined forward wall 128 of the reduced forward end or nose portion 130 of the locking dog lying adjacent the inclined edge 45 of the recess in said member 40. Also, when said ring-like member 40 is held stationary, the pinions 67 will rotate or roll along on the outer surface of the ring-like member 40, due to the engagement with the gear teeth 41, carrying the ring-like member 65 and the member 56, and thus the sprocket toothed portion 59 around with the pinions 67 as these travel around the member 40, due to rotation of the driving member 29. Very little frictional loss occurs in this rotational movement of the member 56 about the member 29 at a slower speed than said member 29, because of the provision of the ball races 137 and 138 and the bearing balls 139 and 140, provided between the members 40 and 65 and the members 29 and 65, said bearing balls being seated, respectively, in the ball races 54 and 137 and the ball races 38 and 138, to thus not only provide for easy rotation of the parts, but providing the proper spacing of the side plate 56 relative to the driving member 29 and of the ring-like member 40 relative to said driving member and said side plate.

If any rearward motion of the driving member 29 should occur before the position of the parts shown in Fig. 14 is reached, when the shift from high to low speed adjustment is taking place, as might occur, if the operator of the bicycle actuates the flexible operating member 100 and at the same time applies the coaster brake, the locking dog will remain with the projection 121 in locking engagement with a recess 32 and the sprocket will remain in high gear. This is true, no matter how much rearward motion will take place, as, if the operator actuates the flexible member 100 to shift from high to low gear, while a backward movement of the pedals is already taking place, such as when applying the coaster brake, the point or nose 130 of the locking lever 110 will engage the sloping top face 132 of the projection 126, which will cam back the enlargement or projection 81 on the rockable ring-like member 80, so that the end wall 48 will pass in front of the end 84 of said enlargement 81, after which said enlargement 81 will continue to be cammed back, because of the engagement of the projection 126 with the back side of the reduced portion 47 of the flange 42 on the member 40, thus preventing any shift out of high gear position as the rockable ring-like operating member will be retracted out of position and will not move the dog out of its position, with the projection 121 thereon in engagement with one of the cooperating recesses 32 on the member 30. Accordingly, even if a backward movement of the sprocket member should take place through a complete revolution of the member 29 and thus of the member 40, there would be no unlocking of the two-speed gear from its high speed adjustment and the coaster brake can be applied, just as if an ordinary sprocket were used.

If the position shown in Fig. 14 of the parts is reached, the position shown in Fig. 18 will be automatically reached and the adjustment into low gear, or slow speed, completed, no matter if a rearward push on the pedals should then be attempted, as the quick shift from the position shown in Fig. 14 to that shown in Fig. 18 takes place substantially instantaneously.

By providing an inner ring-like member that may be held stationary, or may be interlocked with the driving member to rotate as a unit therewith, a two-speed sprocket is obtained, which will operate at the desired high speed and which will gear down the drive sufficiently to give the desired power to climb any hill, such as would ordinarily be encountered in the use of a bicycle, and which, however, does not produce a speed so low as to be undesirable. By utilizing a central ring-like member, instead of an outer ring-like member, a higher speed is obtained with still a sufficient reduction in the gear ratio between the crank and the wheel driven by the sprocket chain when the device is in low gear, and inasmuch as the highest speed attainable on hills that will still enable the climbing of any hill is desirable, there is considerable advantage in this type of gear over one in which the outer ring-like member is held stationary at times and is interlocked with another part to provide the same speed for the sprocket toothed portion as the driving member, due to the fact that the gear ratio is still sufficient to obtain the desired hill climbing ability and yet the speed is not cut down to an undesirably low point.

Another advantage in my improved sprocket wheel is that all of the parts of the speed changing mechanism are carried by the sprocket wheel, except for the bracket carried by the frame and the flexible actuating member and its operating means carried by the frame. By so constructing the sprocket that all of the operating parts of the speed changing means, except the flexible actuating member, are carried by the sprocket wheel, the same is easily put in place on a bicycle to replace an ordinary sprocket wheel and no changes in the structure thereof are necessary for different types and styles of bicycles, the bracket member provided fitting substantially all types of bicycles and being the only part that might have to be altered for radically different types of frames than those ordinarily encountered.

What I claim is:

1. In a sprocket wheel, a driving member, a peripheral sprocket toothed member, a central ring-like member within and spaced from said driving member to provide an annular way therebetween, members rotatably mounted on said sprocket toothed member and engaging said driving and ring-like members, and means for holding said ring-like member stationary during rotation of said driving member, comprising an annular member mounted on said sprocket, means for holding said annular member stationary and means connecting said annular and ring-like members to rotate said rotatably mounted members and drive said sprocket toothed member in the same direction as said driving member at a reduced speed, comprising a rockable locking member mounted on said annular member, said central ring-like member, driving member and sprocket toothed member being fixed against movement axially of said sprocket wheel.

2. In a sprocket wheel, a driving member, a peripheral sprocket toothed member, a central ring-like member within and spaced from said driving member to provide an annular way therebetween, members rotatably mounted on said sprocket toothed member and engaging said driving and ring-like members, positive stop means for holding said ring-like member stationary during rotation of said driving member in either direction to rotate said rotatably mounted members and drive said sprocket toothed member in the same direction as said driving member at a reduced speed, said stop means comprising a member held against rotation, abutment means on said ring-like member, cooperating abutment means on said member held against rotation, means for moving said last mentioned member to engage said abutment means thereon with the abutment means on said ring-like member and means on said ring-like member for holding said abutment means on said member held against rotation from engagement with the abutment means on said ring-like member during rotation of said driving member in one direction.

3. In a sprocket wheel, an annular driving member, a sprocket toothed member, members mounted for rotation on their axes on said sprocket toothed member and engaging said driving member internally, a central ring-like member, means on said central ring-like member engaging said rotatably mounted members and positive stop means for holding said ring-like member against rotation in either direction to rotate said members on said sprocket toothed member upon rotation of said annular driving member and rotate said sprocket toothed member in the same direction as said driving member at a reduced speed, said stop means comprising a member transversely movably mounted on said sprocket wheel, means for holding said transversely movable member against rotation during rotation of said sprocket wheel, spaced abutments on said transversely movable member, abutments on said central ring-like member between which said abutments on said transversely movable member are receivable to hold said ring-like member fixed against rotation, and actuating means for moving said transversely movable member into holding position comprising means rendering said actuating means ineffective to move said transversely movable member into holding position during rotation of said central ring-like member in one direction.

4. In a sprocket wheel, an annular driving member, a sprocket toothed member, members mounted for rotation on their axes on said sprocket toothed member and engaging said driving member internally, a central ring-like member, means on said central ring-like member engaging said rotatably mounted members, positive stop means for holding said ring-like member against rotation in either direction to rotate said members on said sprocket toothed member upon rotation of said annular driving member and rotate said sprocket toothed member in the same direction as said driving member at a reduced speed, and means for throwing said stop means into and out of holding position, comprising a controlling member mounted on said sprocket for limited rotation, a transversely movable member on said sprocket carrying said stop means and controlled in its movements by said controlling member, means for holding said transversely movable member against rotation, and means for moving said controlling member into alternative positions.

5. Mechanism of the character described, comprising a crank shaft, a driving member mounted thereon to rotate therewith, said driving member having an internal ring gear provided thereon adjacent the periphery thereof, a plurality of toothed members internally engaging said internal ring gear to roll thereon and adapted to be rotated thereby, a member having sprocket teeth on the periphery thereof, means for rotatably supporting said rolling members on said sprocket toothed member, and means for producing a rolling motion of said rolling members upon said internal ring gear upon rotation of said driving member in a direction such that said sprocket toothed member rotates in the same direction as said driving member, but at a slower speed, comprising a central ring-like member having a toothed periphery which said rolling members engage, said ring-like member being rotatably mounted on said driving member, and stop means for holding said ring-like member stationary to roll said rolling members around the periphery thereof, comprising a pair of abutments on said ring-like member, a movable ring-like member held against rotation mounted on said sprocket wheel within said sprocket toothed member and adjacent said first mentioned ring-like member having a projection thereon fitting between said abutments, and means for moving said last mentioned ring-like member to project said projection between said abutments during rotation of said first mentioned ring-like member in one direction, said means being inoperative during rotation of said first mentioned ring-like member in the opposite direction.

6. A variable speed mechanism, comprising an outer rotatable driving member having an internal ring gear thereon, an inner ring gear, a driven member having rotatable toothed members thereon mounted between and engaging said ring gears, means for holding said inner ring gear stationary, means for interlocking said inner ring gear and said driving member to rotate as a unit, and means for selectively actuating said holding means and said interlocking means to either hold said inner ring gear stationary or rotate the same as a unit with said driving member, comprising a dog pivoted on said inner ring gear, means on said driving member with which said dog is adapted to engage to hold said ring-like member from rotation in either direction relative to said outer driving member, a transversely shiftable member mounted on said sprocket wheel and having stop means thereon, means for holding said transversely shiftable member against rotation, means on said inner ring gear interengageable with said stop means upon transverse shifting of said shiftable member, and means on said dog holding said stop means on said transversely shiftable member from moving into holding engagement until said dog has been moved out of engagement with the means on the driving member.

7. In a sprocket wheel, a sprocket toothed portion, a member mounted to rotate with a crank axle, and means for rotating said toothed portion either at the same rate as said member on the crank axle or at a slower rate than said member, comprising a ring-like member mounted either for rotation relative to said member rotating with the crank axle or to be fixed thereto, and a dog pivotally mounted on said ring-like member to swing about an axis parallel to the axis of rotation of the crank axle having a locking projection thereon interlocking with abutment means on said member rotating with the crank axle to lock said ring-like member against movement in either direction relative to said member rotating with said axle, said abutment means comprising a substantially radial shoulder and an undercut shoulder, and locking means having locking faces interfitting with said shoulders.

8. In a sprocket wheel, a sprocket toothed portion, a member mounted to rotate with a crank axle, and means for rotating said toothed portion either at the same rate as said member on the crank axle or at a slower rate than said member, comprising a ring-like member mounted either for rotation relative to said member rotating with the crank axle or to be fixed thereto, a dog pivotally mounted on said ring-like member to swing about an axis parallel to the axis of rotation of the crank axle, said dog having a lateral locking projection thereon, and said member rotating with the crank axle having an annular series of alternating projections and recesses thereon providing paired shoulders, one radial and the other undercut, on said member rotating with said crank axle, said locking projection being engageable with any one of said recesses and having locking faces interfitting with a pair of said shoulders to interlock therewith and hold said ring-like member against movement relative to said member rotating with said axle in either direction.

9. In a sprocket wheel, a sprocket toothed portion, a member mounted to rotate with a crank axle, and means for rotating said toothed portion either at the same rate as said member rotating with the crank axle or at a slower rate than said member, comprising a ring-like member mounted for rotation relative to said member rotating with the crank axle or to be fixed thereto, a dog pivotally mounted on said ring-like member having means thereon interlocking with means on said member rotating with the crank axle to lock said ring-like member against movement relative to said member rotating with said axle, and a member mounted on said sprocket and movable substantially parallel to the pivotal axis of said dog transversely of the movement of said dog about its pivot for moving said dog out of locking position, said last mentioned member comprising stop means engageable with cooperating means on said ring-like member to hold said ring-like member against rotation in either direction, and means on said dog engaging said transversely movable member to hold said stop means out of engagement with said cooperating means until said dog has moved entirely out of locking position.

10. In a sprocket wheel, a sprocket toothed portion, a member mounted to rotate with a crank axle, and means for rotating said toothed portion either at the same rate as said member rotating with the crank axle or at a slower rate than said member, comprising a ring-like member mounted for rotation relative to said member rotating with the crank axle or to be fixed thereto, a movable dog on said ring-like member having means thereon interlocking with means on said member rotating with the crank axle to lock said ring-like member against movement relative to said member rotating with the axle, a releasing member engageable with said dog to move said dog out of locking position, and means on said ring-like member engaging cooperating means on said releasing member to hold said ring-like member stationary subsequent to release of said ring-like member from said member rotating with the crank axle, and means on said ring-like member and said dog engaging said releasing member to hold said cooperating means thereon from movement into holding position and said releasing member from releasing said dog during rearward rotation of said member mounted to rotate with the crank axle.

11. In a sprocket wheel, a sprocket toothed portion, a member mounted to rotate with a crank axle, and means for rotating said toothed portion either at the same rate as said member rotating with the crank axle or at a slower rate than said member, comprising a ring-like member mounted for rotation relative to said member rotating with the crank axle or to be fixed thereto, a movable dog on said ring-like member having means thereon interlocking with means on said member rotating with the crank axle to lock said ring-like member against movement relative to said member rotating with the axle, a releasing member mounted on said sprocket wheel and movable transversely of the path of movement of said dog into and out of locking position to move said dog out of locking position, and means on said ring-like member engaging said releasing member to hold said ring-like member stationary subsequent to release of said ring-like member from said member rotating with the crank axle, and means for moving said releasing member into and out of releasing position comprising a member on said sprocket movable into alternative positions.

12. In a sprocket wheel, a sprocket toothed portion, a member mounted to rotate with a crank axle, and means for rotating said toothed portion either at the same rate as said member on the crank axle or at a slower rate than said member, comprising a ring-like member mounted for rotation relative to said member on the crank axle or to be fixed thereto, a movable dog on said ring-like member having means thereon interlocking with means on said member on the crank axle to lock said ring-like member against movement relative to said member on the axle, an annular member mounted on said sprocket against rotation having a releasing member engageable with said dog to move said dog out of locking position, means on said annular member and on said ring-like member cooperating to hold said ring-like member stationary subsequent to release of said ring-like member from said member on the crank axle, a shiftable ring-like actuating member engaging said annular member and having alternative positions controlling the operation of said releasing member, said actuating member being carried by said sprocket, and operating means therefor connected therewith but mounted independently of said sprocket.

13. A variable speed mechanism, comprising an outer rotatable driving member having an internal ring gear thereon, an inner ring gear, a driven member having rotatable toothed members thereon mounted between and engaging said ring gears, means for holding said inner ring gear stationary, a movable locking dog having a locking member thereon, means on said inner ring gear with which said locking member is adapted to interlock to rotate said inner ring gear and driving member as a unit in either direction, and means for selectively actuating said holding means and said interlocking means to either hold said inner ring gear stationary or rotate the same as a unit with said driving member, comprising means for releasing said locking member from said ring gear and thereupon engaging said holding means therewith during forward rotation of said driving member, and means on said inner ring gear and said locking dog holding said releasing means out of operative position during rearward rotation of said driving member.

14. In a sprocket wheel, a driving member, a sprocket toothed member, pinions mounted for rotation on their axes on said sprocket toothed member, a ring-like member, said driving and ring-like members having an annular way therebetween and having gear teeth engaged by said pinions, and means for holding said ring-like member against rotation in either direction to rotate said pinions about their axes upon rotation of said driving member to rotate said sprocket toothed member at a reduced speed, comprising a stationary annular member having an opening therein mounted on said sprocket wheel, said ring-like member being mounted for rotation relative to said annular member and having an opening therein adapted to align with the opening in said annular member, a locking ring having a projection thereon aligning with the opening in said annular member, means urging said locking ring toward said ring-like member to project said projection through said opening in said annular member and into engagement with said ring-like member, a ring-like actuating member mounted for limited rotation on said sprocket to assume alternative positions relative to said locking ring, controlling means for moving said actuating member into either of its alternative positions, and means connecting said actuating member and said locking ring to permit said locking ring to be urged into engagement with said ring-like member in the one position of said actuating member and to hold said locking ring away from said ring-like member in the other position thereof.

15. In a sprocket wheel, a driving member, a sprocket toothed member, pinions mounted for rotation on their axes on said sprocket toothed member, a ring-like member, said driving and ring-like members having an annular way therebetween and having gear teeth engaged by said pinions, and means for holding said ring-like member against rotation in either direction to rotate said pinions about their axes upon rotation of said driving member to rotate said sprocket toothed member at a reduced speed, comprising a stationary annular member having an opening therein mounted on said sprocket wheel, said ring-like member being mounted for rotation relative to said annular member and having an opening therein adapted to align with the opening in said annular member, a locking ring having a projection thereon aligning with the opening in said annular member, means urging said locking ring toward said ring-like member to project said projection through said opening in said annular member and into engagement with said ring-like member, a ring-like actuating member mounted for limited rotation on said sprocket to assume alternative positions relative to said locking ring, controlling means for moving said actuating member into either of its alternative positions, and means connecting said actuating member and said locking ring to permit said locking ring to be urged into engagement with said ring-like member in the one position of said actuating member and to hold said locking ring away from said ring-like member in the other position thereof, comprising a radially projecting pin on said locking ring, said actuating member having a cam slot therein receiving said pin, said slot having a narrow portion at one end thereof and a wide portion at the other end thereof.

16. In a sprocket wheel, a driving member, a sprocket toothed member, pinions mounted for rotation on their axes on said sprocket toothed member, a ring-like member, said driving and ring-like members having an annular way therebetween and having gear teeth engaged by said pinions, and means for holding said ring-like member against rotation in either direction to rotate said pinions about their axes upon rotation of said driving member to rotate said sprocket toothed member at a reduced speed, comprising a stationary annular member having an opening therein mounted on said sprocket wheel, said ring-like member being mounted for rotation relative to said annular member and having an opening therein adapted to align with the opening in said annular member, a locking ring having a projection thereon aligning with the opening in said annular member, means urging said locking ring toward said ring-like member to project said projection through said opening in said annular member and into engagement with said ring-like member, said locking ring being mounted for rocking movement about an axis perpendicular to the axis of said ring and said projection being moved into interlocking engagement with the opening in said ring-like member by a rocking movement of said locking ring first in one direction about said axis to project one end of said projection into said opening followed by a rocking movement of said ring in the opposite direction to project the remainder of said projection into said opening.

17. In a sprocket wheel, a driving member, a sprocket toothed member, pinions mounted for rotation on their axes on said sprocket toothed member, a ring-like member, said driving and ring-like members having an annular way therebetween and having gear teeth engaged by said pinions, and means for locking said driving and ring-like members together to rotate as a unit comprising a locking dog pivotally mounted in an opening in said ring-like member, and means for moving said dog out of locking position and for holding said ring-like member against rotation in either direction to rotate said pinions about their axes upon rotation of said driving member to rotate said sprocket toothed member at a reduced speed, comprising a stationary annular member having an opening therein mounted on said sprocket wheel, said ring-like member being mounted for rotation relative to said annular member and the opening therein being adapted to align with the opening in said annular member, a locking ring having a projection thereon aligning with the opening in said annular member, means urging said locking ring toward said ring-like member to project said projection through said opening in said annular member and into engagement with said ring-like member and said locking dog, means on said locking dog and said projection engaging during forward rotation of said ring-like member to move said locking dog out of locking position and hold said projection in position to move into said opening in said ring-like member, after movement of said dog out of locking position is completed, upon a momentary rearward rotation of said ring-like member, said projection and said dog having engaging means for holding said dog out of locking position after said projection is seated in said opening.

18. In a sprocket wheel, a driving member, a sprocket toothed member, pinions mounted for rotation on their axes on said sprocket toothed member, a ring-like member, said driving and ring-like members having an annular way therebetween and having gear teeth engaged by said pinions, and means for locking said driving and ring-like members together to rotate as a unit comprising a locking dog pivotally mounted in an opening in said ring-like member, and means for moving said dog out of locking position and for holding said ring-like member against rotation in either direction to rotate said pinions about their axes upon rotation of said driving member to rotate said sprocket toothed member at a reduced speed, comprising a stationary annular member having an opening therein mounted on said sprocket wheel, said ring-like member being mounted for rotation relative to said annular member and the opening therein being adapted to align with the opening in said annular member, a locking ring having a projection thereon aligning with the opening in said annular member, means urging said locking ring toward said ring-like member to project said projection through said opening in said annular member and into engagement with said ring-like member and said locking dog, means on said locking dog and said projection engaging during forward rotation of said ring-like member to move said locking dog out of locking position and hold said projection in position to move into said opening in said ring-like member, after movement of said dog out of locking position is completed, upon a momentary rearward rotation of said ring-like member, said projection and said dog having engaging means for holding said dog out of locking position after said projection is seated in said opening, said dog and said projection having interengaging guiding means thereon to hold said dog and projection from disengagement during forward rotation of said ring-like member during the unlocking movement of said dog and movement of said projection into position to hold said ring-like member stationary.

LESLIE G. BOWEN.